United States Patent [19]

Freudenschuss et al.

[11] 4,239,356
[45] Dec. 16, 1980

[54] SYSTEM FOR THE PERFORMANCE OF PHOTOGRAPHING WITH A MOTION PICTURE CAMERA, STILL PICTURE CAMERA OR TELEVISION CAMERA

[75] Inventors: Otto Freudenschuss; Otto Kantner; Gerd Kittag, all of Vienna, Austria

[73] Assignees: Karl Vockenhuber; Raimund Hauser, both of Vienna, Austria

[21] Appl. No.: 13,656

[22] Filed: Feb. 21, 1979

[30] Foreign Application Priority Data

Feb. 28, 1978 [AT] Austria ................................ 1407/78

[51] Int. Cl.³ ........................ G03B 3/00; G03B 17/18; G03B 17/38; H04N 5/26
[52] U.S. Cl. .................................. 354/23 R; 354/195; 354/198; 354/266; 354/289; 352/1; 352/4; 352/140; 352/170; 352/179; 358/227; 367/96
[58] Field of Search ................. 354/25, 195, 198, 238, 354/266, 23 R, 196, 289; 352/1, 140, 179, 170, 4, 171; 358/227; 367/96

[56] References Cited

U.S. PATENT DOCUMENTS

| | | | |
|---|---|---|---|
| 3,757,285 | 9/1973 | Ferre | 367/96 X |
| 4,036,762 | 7/1977 | Troetscher | 354/23 R X |
| 4,085,413 | 4/1978 | Karikawa | 354/238 X |
| 4,157,217 | 6/1979 | Isono | 354/195 X |
| 4,167,316 | 9/1979 | Johnson | 354/195 X |

*Primary Examiner*—L. T. Hix
*Assistant Examiner*—William B. Perkey
*Attorney, Agent, or Firm*—Martin A. Farber

[57] ABSTRACT

A system for performance of photographing with moving picture cameras, still picture cameras or television cameras, particularly of direct sound - movie picture photography, whereby a signal receptor - and/or transmitting - device is coordinated to each photographic object, and the running time between the photographic object, and respectively, between the signal receptor - and/or transmitting - device and the camera is used for determining the distance of the photographic object from the camera and under the circumstances for the automatic distance setting of its camera taking lens. A delay device is provided for the running time signal, the delay time of which is adjustable by means of a handle, whereby in the sense of a delay time shorter then a predetermined delay time the focal plane of the camera taking lens is adjustable particularly continuously in front of the receptor - and/or transmitting device, and in the sense of a longer delay time than the predetermined delay time the focal plane of the camera taking lens is adjustable particularly continuously behind the signal receptor - and/or transmitting - device.

13 Claims, 10 Drawing Figures

SYSTEM FOR THE PERFORMANCE OF PHOTOGRAPHING WITH A MOTION PICTURE CAMERA, STILL PICTURE CAMERA OR TELEVISION CAMERA

The invention relates to a system for performance of photographing with moving picture cameras, still picture cameras or television or video cameras, particularly of direct sound-movie picture photography, whereby a signal receptor- and/or transmitting-device is coordinated to each photographic object, and the running time between the photographic object, and respectively, between the signal receptor-and/or transmitting-device and the camera, is used for determining the distance of the photographic object from the camera and under the circumstances for the automatic distance setting of its camera lens.

From German Offenlegungsschrift OS No. 1,926,650 a method is known for the automatic focusing adjustment of lenses for cinematographic cameras, according to which a transmitter is given to the photographic object, the activity of the transmitter evaluating an adjustment device (which is coordinated to the cinematographic camera) with receiver for the automatic focusing adjustment of the objective lens. Basically this known method uses the running time measurement of signals in the above-described manner. By this known measure it is possible to form a focused image of a performer or of a photographic object on the film, without the focusing adjustment of the camera taking lens being done by the user of the cinematographic instrument. The adjustment of the camera taking lens by a user depends to a large extent on the visual power of the human eye, so that frequently a qualitatively unusable photographing occurs, without the existance of a possibility of correction. However with this known method it is disadvantageous that, for example, self-photographing of the cameraman can only be performed to an insufficient degree, since in spite of the automatic focusing adjustment of the camera taking lens according to the above-described known method, the operation of the cinematographic instrument must be provided the same at the stand location.

It is an object of the invention to create a system for carrying out photography by means of a motion picture camera, by which the cameraman can be brought essentially from his position "behind the movie picture camera" to in front of the objective lens of the camera, and consequently in an advantageous manner can carry out self-photography which is qualitatively of high value.

It is another object of the present invention to aid the solution of the above-mentioned object by providing a system of the introductory-mentioned type wherein a delay device (e.g., 32, 34) is provided for the running time signal, the delay time of which is adjustable by means of a manually adjustable projection (33), whereby in the sense of a delay time shorter than a predetermined delay time the focal plane of the camera taking lens (14, 18) is adjustable particularly continuously in front of the receiver- and/or transmitting device (2, 21, 3, 36, 37, 46, 61), and in the sense of a longer delay time than the predetermined delay time the focal plane of the camera taking lens (14, 18) is adjustable particularly continuously behind the signal receiver- and/or transmitting-device (2, 21, 3, 36, 37, 46, 61).

By these measures it can be achieved that if, for example, the microphone is held in the hand of the user which is stretched out from the body or is arranged on a tripod or support, the actual distance from the motion picture camera to the performer is determined and not, to the signal receiver- and/or transmitting-device, the latter being arranged for example in the microphone housing. Beyond that it is also possible for example for dramatic or scenic reasons, by the adjustment of the focal plane, to transfer this from the foreground to the background, which can be carried out by a simple manipulation of the corresponding manually adjustable projection.

In a further embodiment of the invention it is proposed that the signal receiving- and/or transmitting-device (2, 21, 3, 36, 37, 46, 61) for the running (travel) time measurement together with the delay device (32, 34) with a control device preferably form a construction unit (31), the signal receiving- and/or transmitting-device being assigned to the photographic object (4), which construction unit is provided for transmission of information which is determinable by the performer (4), or respectively, for the remote control by the performer (4) or the like, such as remote control of the moving picture camera (which is equipped under the circumstances as a sound film camera) and/or triggering of the camera drive, image frequency selection, fading-in and fading-out, picture field of view adjustment, etc., whereby preferably at least one of these informations is able to be transmitted by the running time measurement signal itself.

By these particular measures in an advantageous manner it is achieved that the focusing of the camera taking lens of the movie picture camera which is set up at a position spaced from the photographic object as well as the operation of the operating or functioning units which are required for the operation of the camera can be provided at the location, or respectively, in the range of the location of the photographic object. If the movie picture camera is constructed as a sound film camera, the microphone of which is positioned in the range of the exhibitor, thus the operating units for photographing of the sound event for the distance measurement (range determination) and for the remote control of the cinematographic instrument can be located for example in the microphone housing itself and form a construction unit. The microphone itself can be connected with the camera with wires or without wires.

In accordance with another object of the invention the signal receiving- and/or transmitting-device is arranged in a microphone housing (31), the latter being coordinated to a sound film camera or the tv camera (1), and preferably by a common electro/acoustic receiver (2) is provided for the running time measuring signal which is emitted by the motion picture camera (1) and for the speaking information of the performer (4).

Still further with the invention the running time signal and the signal which is derived from the speaking information of the performer (4) are fed to the movie picture camera via a common signal transmission system (e.g., 3, 36, 37, 38).

Yet further with the invention, as signal transmission systems there are provided a galvanic conductor (3), a light signal-preferably an infrared light signal-transmission system (36, 37, 38), an ultrasonic communication system (8, 64) or the like.

In accordance with another feature of the invention the distance indicated or measured value which is derived from the running time of the signal is fed to an input of a comparator device (50), and a signal which is derived from the lens distance setting or focusing control is fed to the other input of the comparator device, whereby the output signal of the comparator device (50) is provided for control of preferably an optical signal device (52, 53, 54), which signal device forms a sharpness or focusing indicator.

Still further by the invention said comparator device (50) comprises a gate discriminator, the gate width of which is defined by a signal which is derived from the size of the aperture stop (57) of the camera taking lens (14, 18), whereby a small value of the gate width is coordinated to a large diaphragm stop opening.

According to another feature of the invention the signal which is emitted from the movie picture camera (1), which signal stands at least in functional or causal connection with the running time measuring signal, is provided as the carrier signal for at least one cinematographic parameter of the movie picture camera (1), such as for example film supply, battery voltage etc., for transmission to the location of the performer (4).

With the above and other objects and advantages in view, the present invention will become more clearly understood in connection with the detailed description of a preferred embodiment, when considered with the accompanying drawings, of which:

Figure 1:
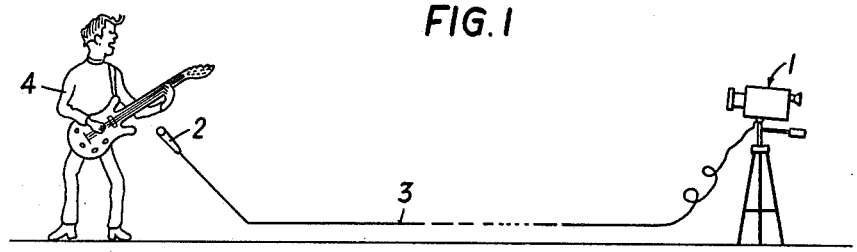
FIG. 1 is a schematic illustration of a performer to which the microphone of a sound film camera is coordinated.

Referring now to the drawings and more particularly to FIG. 1, a movie picture camera 1 is illustrated which is equipped for direct sound-photographing and is mounted on a tripod. The microphone 2 is connected to the camera 1 via a relatively long cable 3 and is arranged in the vicinity of the performer 4. As evident from FIG. 2, the microphone is connected via the line 3 to the recording amplifier 5, which for example in a not-illustrated manner comprises an automatic amplifying control stage for the electrical signal (which signal is derived from the photographic object, or respectively, is derived from the sound event which is associated with this), a final or output stage for the sound recording head 6 and a high frequency oscillator for the premagnetizing of the magnetic track of the movie picture film.

The movie picture camera 1 is placed into operating condition with the main switch of the movie picture camera, whereby for example the exposure control device is activated. Also the switch 7 of the range or distance finder measuring device is coupled with the main switch. Upon closing the switch 7 the astabile multivibrator AMV is activated, the output signal of which is fed to the electroacoustic transformer 8 by means of the amplifier VI. The pulse frequency is chosen high so that it is higher than the frequency range of the electrical signals (which signals are derived from the sound event in the range of the object 4) for sound recording via the amplifier 5 and the magnetic head 6. In dependency on the distance of the microphone 2 from the electroacoustic transformer 8, the sound signal requires a certain travel or running time until it is received by the microphone 2. Via the microphone line 3, which for the running time measurement is practically of insignificant length, the signal which is radiated by the electroacoustic transformer 8 and received by the microphone 2 again is fed back to the camera 1 and to the amplifier V2. The input circuit of the amplifier V2 is formed such that only the higher frequency signals can pass. The amplifier V2 is inhibited or blocked for the signals of the sound events from the range of the performer 4. The recording amplifier 5 to the contrary is rated or designed such that the higher frequency measuring signals cannot be stored on the sound track. The measuring signal which is fed back to the moving picture camera 1 then is amplified in the amplifier V2, is rectified in the stage 9 and is formed via the Schmitt trigger 10 such that the monostable multivibrator MMV1 immediately lets the flip-flop FF flip back. This has the result that the astable multivibrator AMV likewise is inactivated without delay. During the time span of the activation and inactivation of the astable multivibrator AMV, its output pulses were also fed to the counter 11. The number of the output pulses of the astable multivibrator AMV (which are detected by the counter 11 in this time span) or respectively, the output signal of the counter 11, is the measured value for the running time of the acoustical signals from the electroacoustical transformer 8 to the microphone 2, or respectively, from the movie picture camera to the remotely positioned performer 4. The time duration for feeding the measuring signals back via the line 3 can be neglected as already mentioned.

In order yet to automate the additional operation of the range finder or measuring device, the monostable multivibrator MMV2 is connected to the monostable multivibrator MMV1, which multivibrator MMV2 is activated after the dwell time of the monostable multivibrator MMV1 and in this manner the counter is set to zero via the conduction path 12. After the dwell time of the monostable multivibrator MMV2, via the conduction path 13 the flip-flop FF is again flipped, so that the astable multivibrator AMF is activated and respectively the counter 11 is started and the measuring process automatically repeats itself. This periodic performance of the running time determination is carried out until the main switch, or respectively, the switch contact 7 of the camera 1 is opened.

The running time of the measuring signals from the camera 1 to the microphone 2 stands in functional connection or interrelationship with the range or distance of the microphone 2 from the camera 1, whereby the state of the pulse counter 11 represents the desired value for the distance setting or focusing control of the camera lens 14 of the movie picture camera 1. The focusing of the camera lens 14 takes place in the manner that via the electromotor 15 and the shaft 17 which is non-rotatably connected with the pinion 16, the front member engages in the sprocket wheel or tooth wheel rim 18 of the body of the tube of the camera taking lens 14. The shaft 17 in its righthand part is formed as a threaded spindle 19 which stands in engagement with a nut 20. A contact plate 21 is mechanically, rigidly connected with the nut 20. On the contact plate there are arranged contact surfaces (for example 26, 27), the latter cooperating with four contact tongues. In cooperation of the contact tongues 22 to 25 with the contact surfaces 26, 27 and others, depending upon the adjustment of the front member (not illustrated) of the camera taking lens 4, in a digital manner the adjustment of the camera taking lens can be indicated. The contact surfaces 26, 27 and others for example could be arranged in so-called BCD-Code, whereby the digital measured value of the counter 11 of the comparator device 28, in a simple manner permits a comparison with the distance setting or focusing control of the camera taking lens 14. The output signals of the comparator device 28 then control the electromotor 15 in a rotational sense which leads to a correction of the distance setting or focusing control in the sense which is aimed at.

It is conceivable to indicate even on the camera itself the distance or range value which is determined by the running time measuring system, which for example can be accomplished on the wall of the camera 1 or in the viewfinder by means of an electronic number indicator 29, which number indicator is controlled or triggered via the decoding stage 30 from the counter 11.

As evident from FIG. 1, during the performance of movie picture photographing the situation occurs that the microphone 2 is not positioned immediately or directly in the vicinity of the performer 4, but rather is positioned for example at a relatively short distance in front of the photographic object in the direction toward the movie picture camera 1. With the automatic determination of the distance or range from the movie picture camera to the microphone 2 this would have the result that under certain phototechnical conditions (large diaphragm or aperture opening/small depth of field or focus, or focal range of the camera taking lens) the performer no longer would be focused-in or imaged sharply on the movie picture film. In order to satisfy this nuisance which occurs under the circumstances from time to time, according to FIG. 3 a signal influencing stage in the form of a delay stage 32 for the running time measuring signal is coordinated to the running time measuring signal device 2, the latter being arranged in the microphone housing 31. The electronic stages for determining the running time are only partially schematically illustrated in FIG. 3; the circuit construction is essentially identical to that according to FIG. 2.

Figure 4:
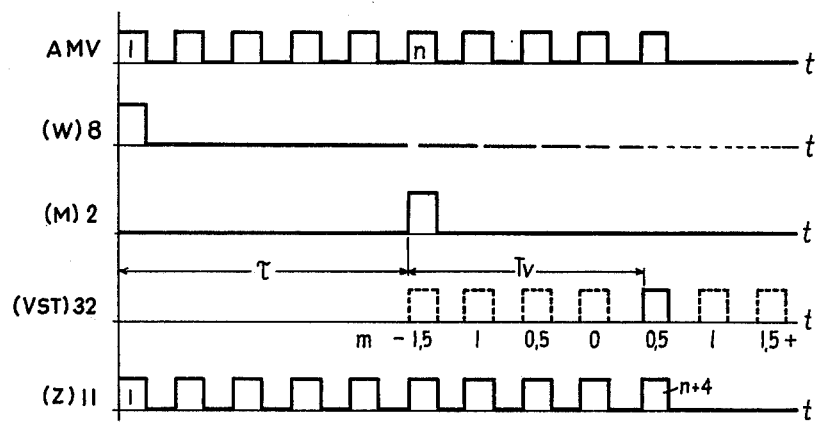
FIG. 4 is a diagram of the running time measuring pulses according to the embodiment of FIG. 3.

The manner of operation of the delay stage 32 is explained on the basis of the pulse diagram according to FIG. 4. The automatic beginning of a running time measurement cycle takes place with the first pulse of the astable multivibrator AMV. This pulse is radiated by the electroacoustical transformer 8 (W) and after the running time $\tau$ is received at the microphone 2 (M) from the transformer. To the contrary of the embodiment according to FIG. 2 now the electrical signal of the microphone 2 is fed to the delay stage 32 (VST), which with the zero position of the manually adjustable projection or slider 33 of the potentiometer 34, the measuring signal which is to be supplied again to the electronic equipment of the movie picture camera (not illustrated) is again transmitted delayed by a predetermined time duration. The counter condition of the counter 11 of the movie picture camera (which counter condition is derived from the sum of the running time $\tau$ and the delay time Tv) is the measured value for the actual distance of the movie picture camera from the microphone 2. By means of the manually adjustable projection 33, via the potentiometer 34 of the delay stage 32 (VST) in the range of the photographic object, the delay time is lengthened such that the distance from the camera to the microphone 2 is increased for example by +0.5 m. Thus a simulated, lengthened running time of the measuring signals is supplied to the electronic equipment of the distance measuring system. The solid pulse in the diagram of the delay stage 32 corresponds to this additionally delayed signal, which pulse then causes the stopping or interruption of the counter 11. A reduction of the defined delay duration of the delay stage 32 causes a shortening of the self-automatically adjusting range or distance of the object of the camera taking lens 14 according to FIG. 2. The counter 11 counts according to FIG. 4 up to the occurrence of the stopping signal from the range of the photographic object for example n+4 pulses.

By this arbitrary influencing of the running time and of the adjustment of the camera taking lens, respectively, a displacement of the focal plane can be provided on the bases of dramatic, scenic or other grounds.

Figure 3:
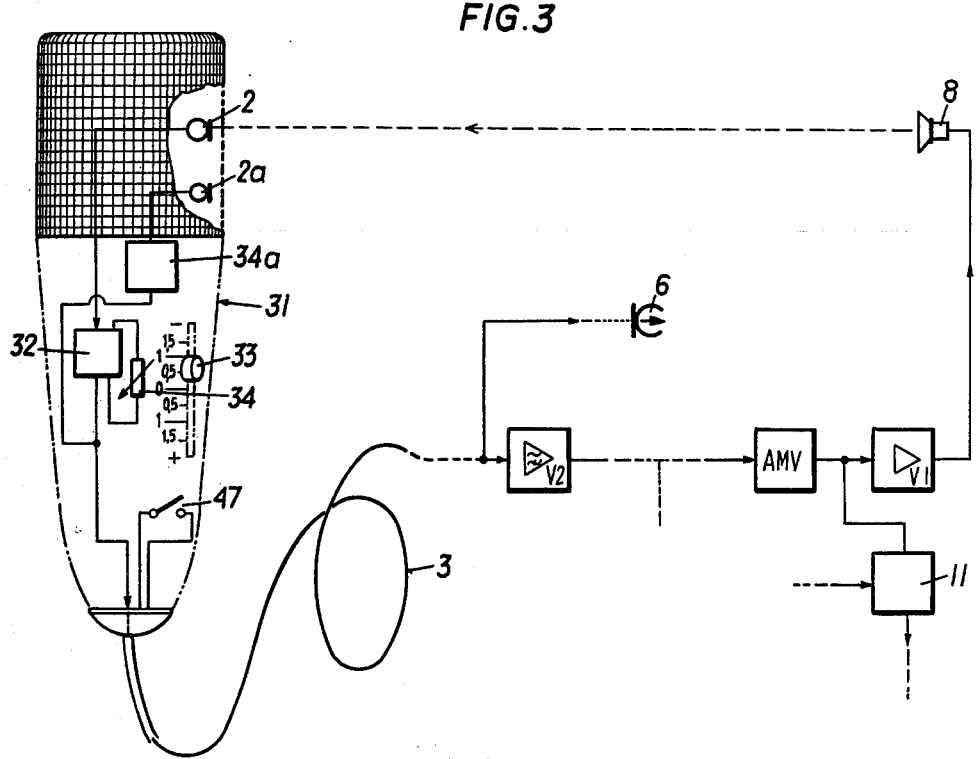
FIG. 3 is a schematic illustration of a microphone of a sound film camera, which microphone is equipped with the signal receiver- and sending device for the running time measurement together with delay stages.

In FIG. 3 for the recording of the sound events which are caused by the recording or photographic object, there is provided a separate microphone 2a to which there is coordinated a preamplifier 34a. The use of two microphones 2 and 2a first of all is practicable if the sound signals for the running time measurement lie in the ultrasonic signal range, since then the electroacoustic transformer 2 can be formed specially for use in the ultrasonic range.

Figure 2:
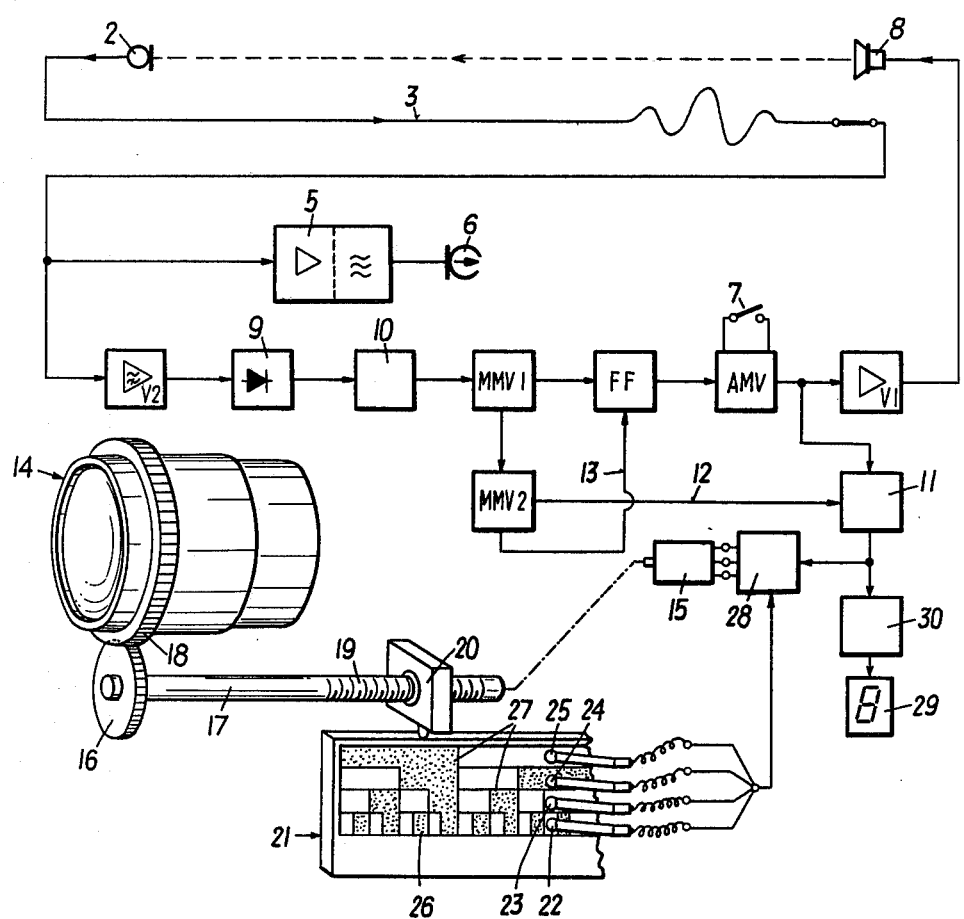
FIG. 2 is a schematic block circuit diagram of a first embodiment of the system for the range or distance determination with a digital control device for the focusing of the camera taking lens of the movie picture camera.

Concerning the monostable multivibrators MMV1 and MMV2 according to FIG. 2 and FIG. 3, respectively, it is emphasized that by the selection of a certain duration of the dwell times in the labial or unstable conditions, a time gate switching of the distance measuring system can be achieved, whereby it is guaranteed that always, only signals are used for determination of the measured values, which signals are received in the direct course and in the shortest path, respectively, from the transformer. In this manner many significant and respectively improper, measuring results are avoidable.

Figure 5:
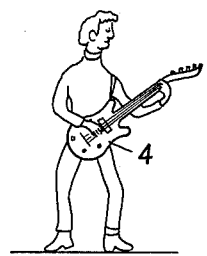
FIGS. 5-7 illustrate three additional embodiments of the system in accordance with the invention.
Figure 5:
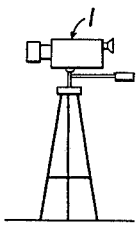
Figure 5:
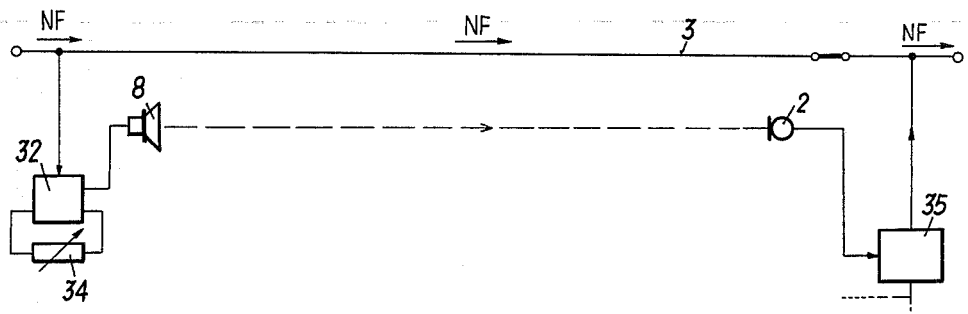

The embodiment according to FIG. 5 shows a running time measuring system with which in contrast to the embodiment according to FIG. 2 and FIG. 3, respectively, the sound generator and electroacoustic transducer 8, respectively, is arranged in the range of the performer 4 and the microphone 2 for receiving the signal which is emitted from the electroacoustical transformer 8 is coordinated to the camera 1. The astable multivibrator AMV, the monostable multivibrators MMV1, MMV2, the flip-flop FF, and the counter 11 are schematically illustrated by block 35. The signal for the electroacoustical transformer 8 is fed over the conduction path 3 from the astable multivibrator of the electronic equipment 35 of the camera in the range of the performer 4. There again by means of the delay stage 32, a delay of the signal results, which delay is arbitrary under the circumstances. This signal, then delayed more or less, is fed from the electroacoustical transformer 8 in the form of sound waves to the microphone 2 of the camera 1. The output signal of the microphone 2 serves for stopping the counter of the equipment 35. The low frequency signal NF which is derived from the sound event in the range of the performer can be lead via the conduction path 3 to the camera. Likewise it is still conceivable to provide a second conductor (not illustrated) in the cable jacket of the conductor 3 and to use this conductor merely for transmission of the low frequency signals.

Figure 6:
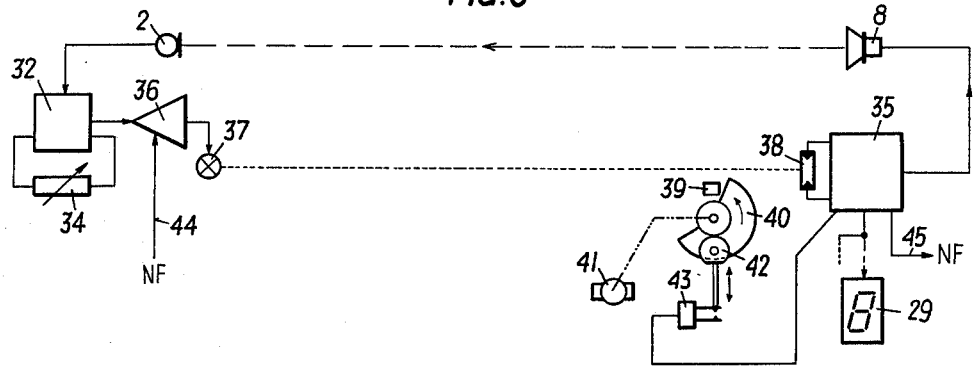

With the embodiment according to FIG. 6 the transmission of the running measuring time signals takes place entirely without wires. The electronic equipment 35 essentially again comprises all stages according to FIG. 2 and FIG. 5, respectively, and triggers and controls the electroacoustical transformer 8 of the camera 1. The microphone 2 is coordinated to the photographic object 4, which microphone is again connected to the delay stage 32. The feedback of the measuring signal and the stopping of the counter, respectively, of the electronic equipment 35 takes place however also on a wireless path, and indeed with this embodiment with the aid of an infrared-light signal transmission system, which at the output of the delay stage 32 there is arranged a driver stage for the light source 37. A photodiode 38 is provided on the camera 1 for the light which is emitted from the light source 37. The output signal of the photodiode is provided for stopping of the astable multivibrator and of the counter, respectively. It can be of advantage that the activation of the light source 37 solely takes place with a blacked out projector film gate 39 of the motion picture camera 1, in order to prevent the light from being imaged on the movie picture film. In addition with the shutter 40 which is driven by the driver motor 41 of the motion picture camera, there is coupled a cam disc 42 which is provided for controlling a switch 43. The switch 43 is disposed in the circuit of the electronic equipment 35, whereby the switching-on moment of the switch 43 is selected with respect to the position of the shutter relative to the picture gate 39 such that the second pulses from the electroacoustic transducer 8 are constantly radiated at such a moment that the activation of the light source 37 certainly can occur only in one position of the rotating shutter 40 in which position by means of the latter the picture gate is covered. Via the input 44 to the driver stage 36 of the light source 37 there can be fed the low frequency signal NF of a microphone for the performer or the like, which signal NF then is feedable at the output 45 of the electronic equipment 35 of the motion picture camera 1 to the recording amplifier 5 according to FIG. 2.

Figure 7:
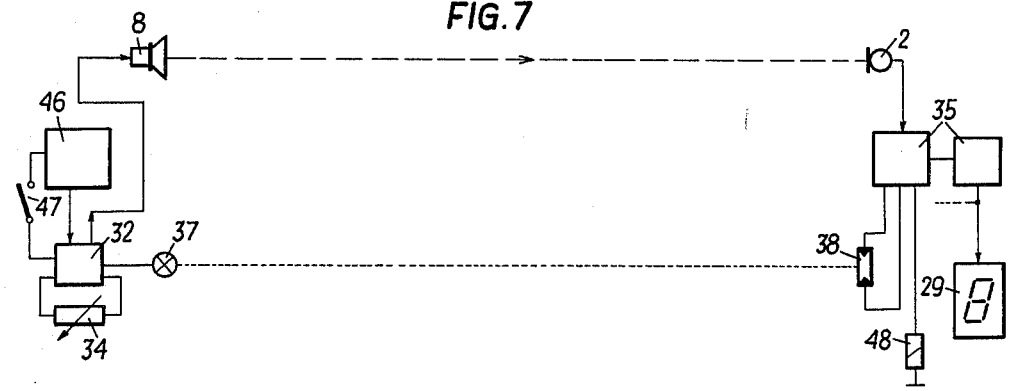

With the embodiment according to FIG. 7 the electroacoustical transformer 8 and the light source 37 are arranged in the vicinity of the photographic object. The driving control or triggering of the electroacoustical transformer 8 takes place by the pulse generator or transmitter 46, the output signal of which is fed to the delay stage 32. The light source 37 is activated independently of the delay time of the delay stage 32, which delay time is adjusted or set by the potentiometer 34. Via the photodiode 38 of the camera 1 the light source 37 starts the astable multivibrator and the counter of the electronic equipment. Depending upon the magnitude of the selected delay, then the electroacoustical transfomer 8 is excited, the signal of which is detected by the microphone 2 on the camera 1 and is provided for inactivation of the astable multivibrator and for stopping the counter, respectively. With this embodiment the two active construction stages, namely the sound transmitter 8 and the light transmitter 37 are installed together in one housing which is associated with the area of the photographic object. This housing can be a remote control for the motion picture camera, which, for example is constructed also for placing in operation and triggering, respectively, the cinematographic device. Moreover the switch 47 is provided in the range of the photographic object 4. By this switch, via the light source 37 a pulse of a certain configuration is transmitted, which pulse then is decoded in the electronic equipment 35 in the range of the camera 1 and excites the release or trigger relay 48. Such a type of a distance measure—and remote control—system is suited particularly for silent film cameras (see also switch 47 in FIG. 3).

Figure 8:
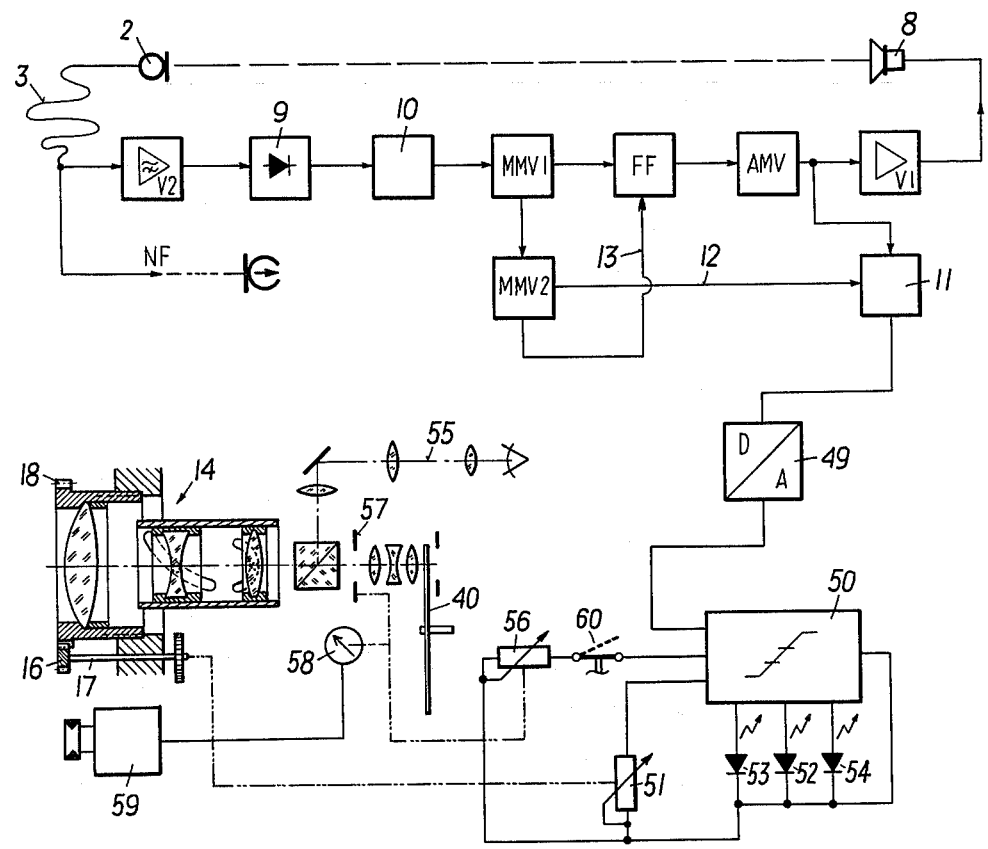
FIG. 8 illustrates an embodiment of the system in accordance with the invention and a focusing indicator.

The embodiment according to FIG. 8 uses essentially the measuring principle according to FIG. 2. Differently from FIG. 2 yet the adjustment or setting of the camera taking lens 14 takes place manually by the user of the cinematographic device. In addition, at the output of the counter 11 there is connected a digital/analog transformer or transducer 49, the output signal of which is fed to the first input of a window or gate discriminator 50. A signal is fed to the second input of the gate discriminator 50, which signal stands in functional interrelationship with the adjusted or set range of the camera taking lens 14. This signal is obtained by means of the setting or adjustment controller 51, the slider of which is coupled with the shaft 17 of the toothed gear 16, which toothed gear is provided in engagement with the toothed gear 18 for displacement and adjustment of the front member of the camera taking lens 14. The gate discriminator 50 serves as a comparator device for the signal voltage (the desired signal) which is determined from the running time of the signal of the electroacoustical transducer 8 and to the signal voltage (the actual signal) which is derived from the adjustment or setting of the camera taking lens via the adjustment controller 51. If the two signal voltages are equal, the light-emitting diode 52 is illuminated. If the determined range or distance is larger than the range value which is adjusted or set by the objective lens 14, then the diode 53 is illuminated. To the contrary if the range or distance which is determined by the running time measurement is smaller than the range or distance which is adjusted or set on the objective lens 14, thus the light-emitting diode 54 is activated. In this manner the user of the motion picture camera always knows whether the range setting or focusing control of the objective lens is necessary and in which direction a possible correction is to be performed. The light-emitting diodes 52 to 54 in an advantageous manner can be provided in the optical path of the viewfinder 55. In this manner for the user of the cinematographic device an auxiliary device is created which facilitates under circumstances even faultysighted amateurs to achieve qualitatively high quality photographing.

From FIG. 8 it still is to be seen that at a terminal of the gate discriminator 50 there is provided an additional adjustment controller 56, the slider of which is coupled with the aperture stop. The adjustment of the aperture stop 57 is brought about via the rotor of the electromotoric transformer 58 which is controlled by the photometric light measurement device 59. By means of the adjustment controller 56 the value of the width of the window or gate of the gate discriminator 50 is chosen, whereby the linkage or coupling with the diaphragm control device is provided such that a large aperture or stop opening leads to a small gate width and a small aperture or stop opening leads to a large gate width, respectively. In this manner a large field of depth (or depth of focus) is associated with a large gate width and a small depth of field (or depth of focus) of the camera taking lens is associated with a small gate width. In addition to the references about necessary correction of the range setting or focusing control, the user can even obtain evidence concerning the depth of field or focus range by these measures. By opening the switch 60 the depth or field or focus indication is activated.

Figure 9:
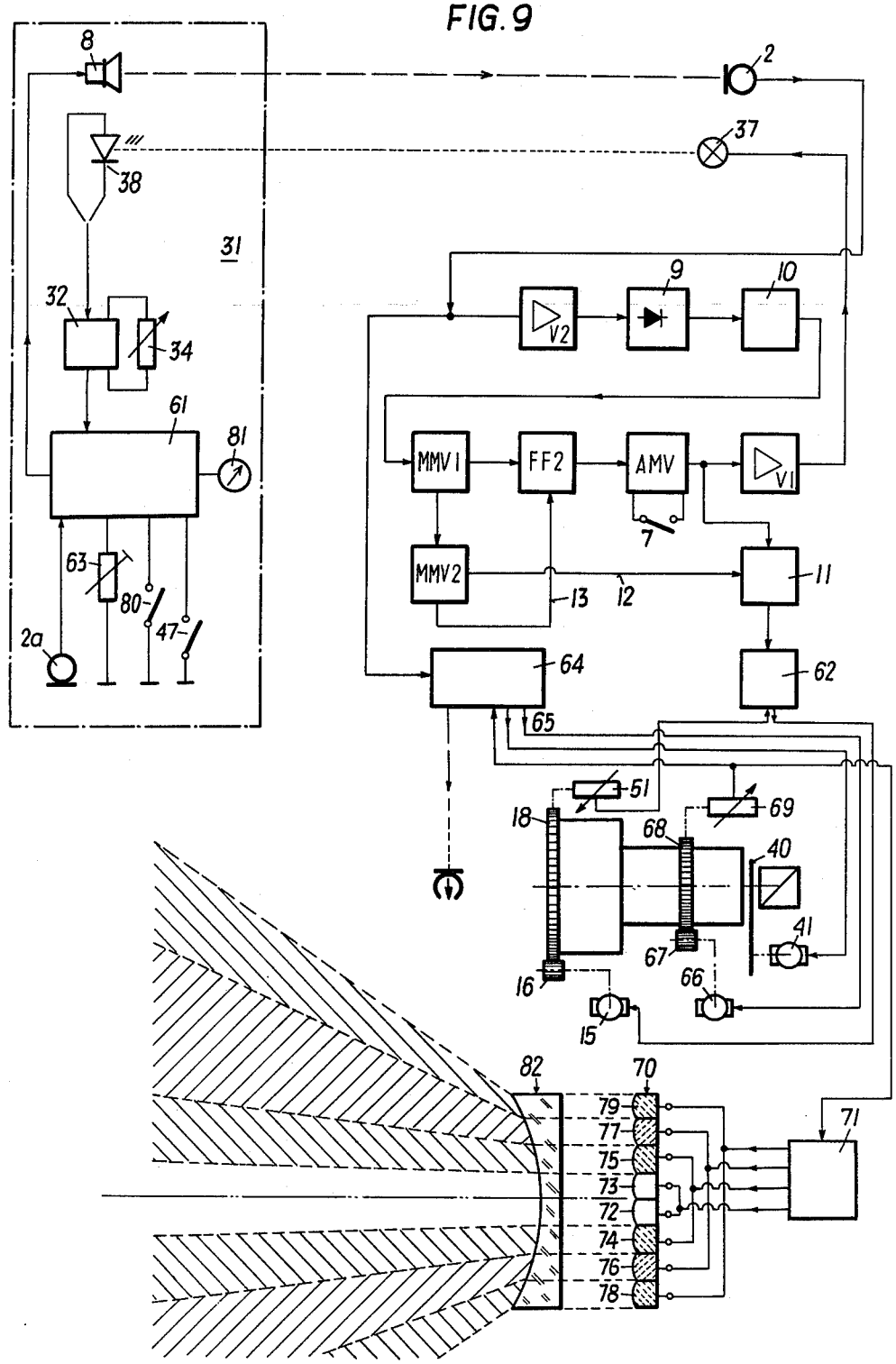
FIG. 9 is an embodiment form of the system in accordance with the invention with which an adjustment of the image field of the movie picture camera can be carried out from the location of the camera taking lens.

With the embodiment according to FIG. 9 to the contrary of FIG. 2 the light source 37 on the camera is energized or excited by the amplifier V1. Simultaneously with the first pulse to the counter 11 a light pulse is emitted from the light source 37, which light pulse in the range of the photographic object is detected by the photodiode 38. After the signal of the photodiode 38 has passed the delay stage 32 (and was delayed by a certain time interval), the signal generator 61 is controlled or triggered, the signal generator being provided for excitation of the electroacoustical sound transformer 8. The sound signal which is radiated by the electroacoustical transformer from the vicinity of the photographic object is received by the microphone 2 of the movie picture camera and leads to the inactivation of the astable multivibrator and respectively to the stopping of the counter 11. The stage 62 has a digital/analog transducer and a comparator stage for the voltage value of the distance or range (which distance or range is set on the objective lens 14), the voltage value being derived over the adjustment or variable resistor 51. The automatic focusing takes place by means of the electromotor 15 and by means of the pinion 16 (which pinion is driven by the latter) on the sprocket wheel or toothed wheel rim 18 of the tube of the camera taking lens.

The signal generator 61 in the microphone housing 31 has a modulator for the signal which is radiated to the camera, by which the transmission is able to be carried out by the remote control commands for the camera. By means of an adjustment controller 63 the image field of the camera taking lens can be remotely adjusted. For this a demodulator 64 is connected to the microphone 2 of the camera, over the output connection 65 of the demodulator, the electromotor 66 can be supplied with operating voltage. The electromotor 66 via the pinion-toothed gear transmission 67, 68 adjusts or controls the corresponding optical members of the camera taking lens for the zoom movement. The adjustment movement is detected by the variable resistor or rheostat 69 which announces the prevailing position and adjustment, respectively, of the image field to a comparator device 64, the latter being coordinated to the demodulator 64. This comparator- and tracking-control, respectively, for adjustment of the image field can be formed similarly with the stage 62, which stage is provided for the adjustment or control of the range or distance.

In order to signalize the adjusted photographic angle still to the performer in front of the camera taking lens of the camera, an optical signal device 70 is provided, which for example comprises eight light sources (light-diodes) and according to the indicated plan view are arranged on the front side of the camera as horizontal ridges or bars. The control and driving of the individual light sources takes place over the wiper of the potentiometer 69 and the control amplifier 71 in the form that with an adjusted small photographic angle (teleposition of the zoom optic) solely the light sources 72 and 73 are turned on. With enlargement of the image field and the photographic angle, respectively, then additionally the light element 74 and 75, and respectively, 76 and 77, and respectively, 78 and 79 are turned on. The middle light sources are coordinated to a small image field, the outer light sources are coordinated or associated to a large image field. In order however to satisfy the optical physical characteristics of the camera taking lens, a diverging or negative lens 82 is arranged in front of the light ridge 70, the optical properties of which lens 82 are selected such that the radiated light beam corresponds with the adjusted photographic angle of the camera taking lens. The light sources which are arranged per se in the horizontal symmetrically to the optical axis can have different pairwise coloring, so that upon observance of the front side of the camera it is possible at any time for the performer to clearly unequivocally determine whether and in which part of the image field he is located. Even if the indication of the picture field is provided only stepwise, in this manner still an auxiliary means is provided for the amateur to self-determine his position in the image field in front of the camera.

Further possibilities for the easily recognizable indication for the performer of the adjusted image field of the motion picture camera are described in Austrian Pat. No. (A 1394/75), incorporation by reference hereby being made.

In addition to the picture field adjustment it is also conceivable for the switch contacts 47 to perform a remote triggering of the camera. Likewise via the switch 80, fading-in or fading-out of the movie picture photography can be performed remote controlled. Via the microphone 2a the language information for the second recording can be fed to the modulator 61. The command and or instruction signals can be led off from the democulator on the camera side. Under circumstances a control measuring instrument 81 can be coordinated to the microphone housing 21, with which instrument the performer can determine whether his voice and respectively certain environmental or background noises are sufficiently loud or low, respectively.

It would be conceivable, by means of the signals (light or acoustical signals) which are emitted at the camera side, to send even certain information about the camera drive to the performer. Also it would be thinkable for example to transmit information concerning the film supply or battery voltage into the range of the photographic object. By corresponding modulation of the light signals (pulse length modulation, frequency modulation) this can take place in a simple manner without influencing the running time measurements. The control measuring instrument could in this manner be used multiply. The film supply and the battery voltage, respectively, could be transmitted on call by the performer.

Instead of the digital running time determination, it would also be conceivable to perform this in an analog manner. Basically sound or ultrasonic signals can be used advantageously as running time measuring signals. It is advantageous to perform a temperature compensation for the value of the determined running time, since the ultrasonic speed varies by different temperatures of the air, namely according to the Gustav Büscher "ABC der Elektroakustik", $C = 330 \pm 0.6 \times t$, whereby C is the speed and t is the temperature in Celsius degrees. The compensation could be performed in the form that the temperature sensor or detector is provided for the atmosphere or the outside air of the photograph scene, the temperature sensor being coordinated to the (digital) calculator or computer device for the determination of the distance or range value.

Figure 10:
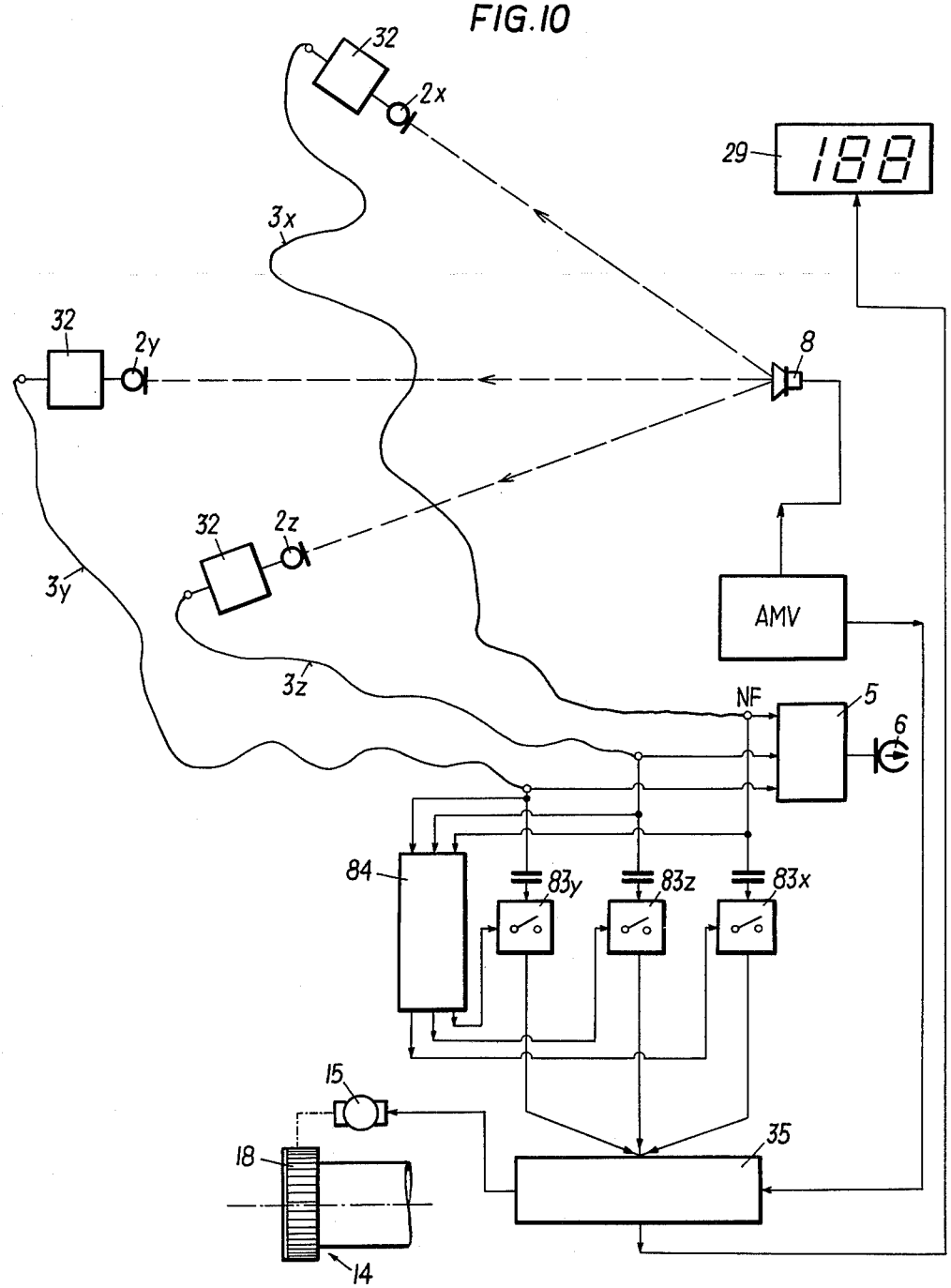
FIG. 10 is an illustration of an additional embodiment of the invention with several transmitting-/receiving-devices for the range or measurement determination.

In FIG. 10 there is illustrated a system for the performance of photographing with automatic focusing of the camera taking lens 14, by which inside of the image field of the camera, for example, there are three photographic objects. These photographic objects are yet positioned at different distances relative to the camera. One such arrangement under circumstances could be provided with three speakers in a scenic representation. A microphone, 2x, 2y, 2z is coordinated to each photographic object which microphone respectively is each connected via a line 3x, 3y, 3z to the electronic equipment of the camera. The microphones 2x, 2y, 2z serve for recording of the sound events from the surroundings (thus from each performer standing in the vicinity) as well as for recording of the measurement signals which are radiated from the electroacoustical transducer 8. The electroacoustical transformer 8, as with the previously described examples, is controlled or driven by an astable multivibrator AMV and belongs to the electronic distance measurement device 35. The recording amplifier 5 has three signal inputs (not illustrated) for the low frequency signals NF which are derived from the noises. The measurement signals of the transformer 8 which are fed back via the lines 3x to 3z are each respectively guided via the switching stage 83x, 83y, 83z, respectively, to the electronic equipment 35 for the running time determination and range or distance value determination, respectively. The undesignated capacitors are symbolically illustrated in the feed lines in front of the switching stages 83x to 83z, so that merely for example the high frequency running time measuring signals (compared with the low frequency speaking signals) can pass these stages. If the performers who act or play their parts in the vicinity or who are associated with the microphones 2x to 2z perform an exchange conversation (interview), a scenic representation, etc., consequently it is necessary to focus the camera taking lens 14 from time to time under the circumstances to each of the directly speaking performers. According to the embodiment of FIG. 10 this is carried out in the manner that by means of the comparator device 84 it is determined which of the microphones 2x to 2z is directly spoken to, or respectively, which of these microphones emits the highest low frequency-signal level. The outputs of the comparator device 84 for this low frequency signal level then control the corresponding switching stages 83x, 83y, 83z, whereby it is attained that the feedback of the running time signal to the range or distance measuring device 35 actually takes place from each microphone 2x, 2y, 2z which is spoken to, or respectively, which is the instantaneous "scene centerpoint" of the performance. Then the motor 15 for the adjustment of the camera lens 14, 18 is controlled or triggered by the distance measuring device 35, and again on the outside or in the viewfinder of the camera, the distance or range can be indicated according to numbers by means of the indicator device 29.

While there have been disclosed several embodiments of the invention it is to be understood that these embodiments are given by example only and not in a limiting sense.

We claim:

1. A device for photographing a photographic object constituting a performer, with a camera, such as motion picture cameras, still picture cameras or television cameras, particularly of direct sound-movie picture photography, the camera having a camera lens, comprising
    transformer means for emitting a running time measurement signal,
    signal receiving means for receiving said measurement signal from said transformer means,
    one of said means being disposed at the camera, and the other of said means being spaced apart a distance from said one means and being associated with the photographic object, the time of travel of said running time measurement signal from said transformer means to said receiving means defining a running time corresponding to said distance,
    distance determining means for determining an effective time value of said running time measurement signal,
    signal transmitting means for transmitting the measurement signal at least from said signal receiving means to said distance determining means,
    means for adjusting the focal plane of the camera lens,
    delay means for operatively delaying the running time measurement signal,
    means for adjusting the delay time of said delay means,
    said delay means for changing said effective time value of said running time measurement signal such that with the delay time being shorter than a predetermined delay time the focal plane of the camera lens is adjustable ahead of a focal setting corresponding to said predetermined delay time, and with a delay time longer than the predetermined delay time the focal plane of the camera lens is adjustable behind a focal setting corresponding to said predetermined delay time.
2. The device as set forth in claim 1, wherein
    a control device constituting means for controlling functions of the camera,
    said other means together with said delay means and said control device form a construction unit,
    said construction unit constituting means for transmission of information which is determinable by the performer, and respectively, for the remote control by the performer, such as remote control of the motion picture camera and/or triggering of the camera drive, image frequency selection, fading-in and fading-out, image field of view adjustment.
3. The device as set forth in claim 2, further comprising
    means for transmitting at least one said information by the running time measurement signal itself.
4. The device according to claim 1, further comprising
    a microphone housing operatively coordinated to said camera,
    said other of said means is arranged in said microphone housing,
    said transformer means is an electro/acoustic transformer for the running time measurement signal, said transformer means is mounted on said camera such that said running time measurement signal is emitted from the camera, and
    said receiving means constitutes a common acoustic receiver for receiving said running time measurement signal which is emitted from the camera as well as for receiving audible information from the performer.

5. The device according to claim 4, further including
said acoustic receiver constitutes means for providing an audible information signal from said audible information from the performer,
said signal transmitting means includes a portion constituting a common signal transmission system means for feeding the running time measurement signal and the audible information signal toward the camera.

6. The device according to claim 5, wherein
said common signal transmission system means includes a galvanic conductor connected to said common acoustic receiver.

7. The device according to claim 1, further comprising
means for providing an audible information signal from audible information from the performer,
said signal transmitting means includes a portion constituting a common signal transmission system means for feeding the running time measurement signal and said audible information signal toward the camera,
said common signal transmission system means includes a light signal transmission system.

8. The device according to claim 7, wherein
said light signal transmission system is an infrared light signal transmission system.

9. The device according to claim 1, wherein
said transformer means and said signal receiving means comprise an ultrasonic communication system.

10. The device according to claim 1, further comprising
a comparator,
said distance determining means for feeding a distance measured value which is derived from the running time of said measurement signal to an input of said comparator,
means for feeding a signal which is derived from a distance setting of the camera lens to another input of said comparator,
an optical signal means for being controlled by an output signal of said comparator, said optical signal means constituting a focusing indicator.

11. The device according to claim 10, wherein
said comparator comprises a gate discriminator, the gate width of which is defined by a signal which is derived from the size of an aperture stop of the camera lens, with a small value of the gate width being coordinated to a large diaphragm stop opening.

12. The device as set forth in claim 1, further comprising
means for effecting the adjustment of the focal plane of the camera lens continuously.

13. The device as set forth in claim 1, wherein
said means for adjusting the delay time is positioned near the performer and constitutes a manually adjustable projection.

* * * * *